United States Patent

Hahner

[15] 3,667,310
[45] June 6, 1972

[54] SELF-TIGHTENING TRANSMISSION GEAR MOUNTING

[72] Inventor: Reinhard Hahner, Stuttgart, Germany
[73] Assignee: Robert Bosch GmbH, Stuttgart, Germany
[22] Filed: Jan. 29, 1971
[21] Appl. No.: 111,031

[30] Foreign Application Priority Data
    Feb. 20, 1970   Germany......................P 20 07 849.3

[52] U.S. Cl..............................74/417, 74/412 TA, 192/20
[51] Int. Cl........................................F16h 1/14, F16d 21/04
[58] Field of Search..................74/412 TL, 417; 192/20, 31, 192/54

[56] References Cited
UNITED STATES PATENTS
3,563,353   12/1971   LoPresti...................................192/21

Primary Examiner—Leonard H. Gerin
Attorney—Michael S. Striker

[57] ABSTRACT

A drive gear is freely mounted on a drive shaft and meshes with an output gear on an output shaft. The meshing teeth are slanted so that a load on the output shaft and output gear, produces an axial force component on the driven gear, urging the same into frictional engagement with a threaded nut so that the same is held against rotation, and moves axially to press the drive gear into tight engagement with an abutment on the drive shaft while the rotating drive shaft screws a threaded portion thereof into the nut.

10 Claims, 2 Drawing Figures

PATENTED JUN 6 1972

3,667,310

INVENTOR:
Reinhard HAHNER

BY

[signature]

his ATTORNEY

3,667,310

SELF-TIGHTENING TRANSMISSION GEAR MOUNTING

BACKGROUND OF THE INVENTION

Many ways are known for securing a gear to a drive shaft. According to one arrangement of the prior art, the shaft is splined, or is formed with a single key groove engaged by a key. The shaft is weakened by the grooves, and must be constructed with a greater diameter to have the same strength. Since key grooves and splines have usually sharp edges, a fracture of the shaft in the region of the groove is not uncommon. A single key groove may produce inner tensions in the shaft which cause an undesired curvature in the same. Furthermore, the key may exert a one-sided pressure on the respective gear, so that the same does not run true. If the gear is connected with a shaft by a frictional connection, threaded means must be provided, which require a locking means for preventing the loosening of the threaded parts.

It is also known to mount a gear on a shaft by pressing the gear in axial direction onto a corresponding cylindrical portion of the shaft, or by pressing the shaft into the central opening of a gear. Frictional connections of this type have the disadvantage that the shaft and the gear must be assembled at a press, so that it is not possible to separately insert the two parts into a housing, and to assemble the parts in the housing, which causes difficulties in the construction of the bearing, the dimensioning of the housing parts, and difficulties during assembly. Furthermore, the pressing operation causes frequently bending of the shaft, particularly if the same has a great length.

Another disadvantage is that a gear pressed onto the shaft, cannot be removed from the shaft, so that damage to the gear requires substitution of a new shaft in addition to the new gear, which is particularly expensive, if the shaft not only carries the gear, but also the rotor of a drive motor, which has to be also exchanged when the gear is damaged. In some cases, it is even necessary to replace one or several bearings when the shaft with the gear has to be removed.

Another way of mounting a gear on a shaft is to clamp the gear between a flange fixed on the shaft and a threaded means. Such connections require very great clamping pressure in order to assure a reliable connection of the shaft with the gear, so that the parts of the coupling must be accordingly constructed and dimensioned. In order to produce the force necessary for clamping, respective parts must be provided with key faces to which wrenches can be applied with great force. This causes again limitations for the dimensioning of the gear, shaft and transmission housing. The connection is nevertheless not fully reliable, since oscillations or great temperature fluctuations cause a loosening of the threaded connection.

It is also known to connect a gear with a shaft by a bonding material between the inner surface of the gear and the outer surface of the shaft. The bonding agent may be solder, or an adhesive, or a substance causing corrosion may be used which causes roughening of the abutting surfaces of the gear and shaft, so that a coupling connection is obtained. In this manner, the gear is permanently secured to a shaft, and cannot be removed from the same, so that the construction has the same disadvantages as the pressing of the gear onto the shaft.

SUMMARY OF THE INVENTION

It is one object of the invention to overcome the disadvantages of the prior art concerned with the mounting of a gear on a shaft, and to provide a self-tightening gear mounting.

It is another object of the invention to provide a gear mounting which permits the separate insertion of gear and shaft into a housing, and mounting of the gear in the housing, without the use of special tools.

Another object of the invention is to provide a gear mounting which can be easily assembled and dis-assembled.

Another object of the invention is to provide a gear mounting which does not weaken the shaft on which the gear is mounted, and does not cause deformation of the same or of the gear.

Another object of the invention is to provide a gear mounting which permits transmission of a torque from a shaft to the gear thereon without any slippage to another gear.

With these objects in view, one embodiment of the present invention comprises drive shaft means rotating in one direction of rotation and including a cylindrical shaft portion, an abutment at one end, and a threaded portion at the other end of the cylindrical shaft portion; a first gear mounted on the cylindrical portion and having a set of first gear teeth; nut means mounted on the threaded portion adjacent the first gear; and rotary output means including a second gear having a set of second gear teeth meshing with the first gear teeth.

In accordance with the invention, at least one of the sets, and preferably both sets, have gear teeth slanted in axial and circumferential directions relative to the direction of rotation of the drive shaft means. As a result, the first gear moves in one axial direction along the cylindrical shaft portion into frictional engagement with the nut means when a load acts on the output means and the second gear opposes rotation of the first gear.

Since the nut means is held by the output means and first gear abutting thereon against rotation, it is tightened while the threaded portion of the drive shaft means screws into the nut means and the nut means moves in the opposite axial direction and presses the first gear against the abutment for non-rotatably securing the first gear to the drive shaft means.

The first gear has a central bore through which the cylindrical shaft portion passes so that the first gear is axially movable and rotatable on the cylindrical shaft portion, until pressed by the nut means against the abutment. The first gear has preferably two abutment surfaces on opposite sides, which are planar and are located in planes perpendicular to the axis of the drive shaft means and cylindrical shaft portion.

The abutment at one end of the cylindrical shaft portion, is preferably formed by the inner ring of a roller bearing. The axial length of the hub portion of the first gear is greater than the axial length of the cylindrical shaft portion so that the nut means is still threaded on the threaded portion of the drive shaft means when the first gear abuts the abutment while engaged by the nut means.

The self-tightening transmission gear mounting of the invention has particular advantages when used in a manually-operated power tool. Manually-operated power tools are particularly sensitive to oscillations, which may be caused by a very small bending deformation of the drive shaft of the high-speed motor. Manual power tools of this type have to be very compact, without being heavy, so that housings consisting of many parts, as may be required by pressed-on gears, have serious disadvantages.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
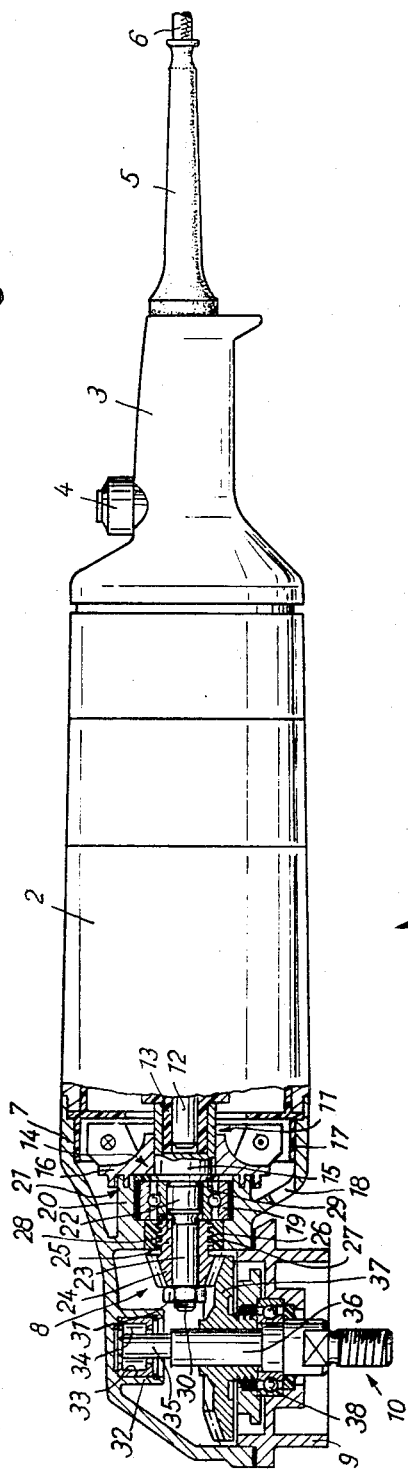
FIG. 1 is a side elevation, partially in section, illustrating a manual power tool provided with the self-tightening transmission gear mounting of the invention.
Figure 2:
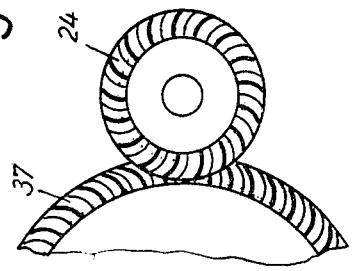
FIG. 2 is a fragmentary schematic view illustrating the gear teeth of two meshing gears constructed in accordance with the invention, and used in the power tool of FIG. 1.

Referring first to FIG. 1, a power tool has a motor housing 2 in which a motor, not shown, is mounted. To the rear end of motor housing 2, a hollow handle portion 3 is secured which is hollow and supports a switch button 4 on top. An elastic tubular member 5 is secured to the rear end of handle portion 3 to protect the end of a cable 6 by which the motor in housing portion 2 is provided with electric current.

A transmission housing 7 is secured to the front end of motor housing 2, and envelopes an angular transmission 8. Transmission housing 7 has a bottom opening closed by a cover 9 which has an opening through which an output shaft 10 projects downward. A thread on output shaft 10 permits the attachment of a tool, for example a grinding tool, not shown.

The motor shaft means 11 include the end portion 12 of the motor shaft, which projects into the transmission housing 7. An insulating bushing 13 is mounted on shaft portion 12, and carries a stepped drive shaft means 14 which has a portion 15 of greater diameter supporting a fan 16, a journal portion 22 of somewhat smaller diameter, separated from portion 15 by a shoulder, a cylindrical shaft portion 23, and a threaded portion 13 on which a nut 31 is mounted. An annular member 17 for guiding the air moved by fan 16 is provided where the motor housing 2 is connected with the transmission housing 7. Fan 16 sucks air heated by the motor, not shown, out of motor housing 2, and blows the air out of openings 18 in transmission housing 7.

A ball bearing 19 is mounted in a transverse wall 20 of the transmission housing 7, and has an inner ring secured to the journal portion 22. A labyrinth seal 21 between fan 16 and housing wall 20 protects ball bearing 19 from dust. The cylindrical shaft portion 23 is located in front of journal portion 22 separated from the same by a neck portion. The threaded portion 30 at the other end of cylindrical shaft portion 23, has a smaller diameter than the same.

During assembly, when nut 31 is detached from threaded portion 30, a bevel gear 24 is placed on the cylindrical shaft portion 23 by sliding bevel gear 24 in axial direction towards the rear. Gear 24 has a hub 25 provided on the outside thereof with an oil-returning screw thread 26 surrounded by sealing packing 27 mounted in housing wall 20. The end face 28 of hub 25 of gear 24 abuts the inner ring of ball bearing 19, and the inner ring abuts annular abutment shoulder formed on shaft portion 15 adjacent journal portion 22. Bevel gear 24 has been mounted on the cylindrical shaft portion, and is supported by the same for axial and rotational movement. Nut 31 is screwed onto the threaded portion 30 until it abuts the front end face of gear 24.

Transmission housing 7 has an annular inwardly projecting wall 32 in which a ball bearing 34 is mounted. The journal end portion 24 of an output shaft 10 is rotatably supported by roller bearing 34. A cylindrical portion 36 of output shaft 10, carries a pressed-on second bevel gear 37 which has a greater diameter than bevel gear 24, and meshes with the same. The cover 9 of the transmission housing 7 has a portion supporting a ball bearing 38 in which the hub of gear 37, and thereby output shaft 10, is mounted for rotation. The axis of output shaft 36 is perpendicular to the axis of drive shaft means 14 and motor shaft 12.

The two meshing bevel gears 24 and 37 are provided with peripheral sets of teeth which are slanted and bent along circles. The teeth of gear 24 are curved in clockwise circumferential direction as viewed from the axis of the gear in outward radial direction, while the larger gear 37 has teeth which are curved in counterclockwise direction as viewed from the axis of gear 37 outward in radial direction. The circumferential and axial directions of the curvature or slant of the respective gear teeth are in a certain relation to the direction of rotation of motor shaft 12 and drive shaft means 14, which is indicated by symbols 16a and 16b on the blades of cam 16, the symbol 16a representing the rear end of an arrow, and the symbol 16b representing the pointed end of the arrow so that shaft means 12 and 14 rotate in counterclockwise direction when viewed from the front end of the power tool.

When the apparatus is assembled, the rotor of the drive motor with the motor shaft 11,12 the insulating bushing 13, and the drive shaft means 14 carrying the fan wheel 16, are inserted into the motor housing 2. The transmission housing 7, with ball bearing 19 already mounted in the housing wall 17, is attached and secured to the front end of motor housing 2, while the inner ring of ball bearing 19 slides onto the journal portion 22 of the drive shaft means 14.

Gear 24 is manually placed on the cylindrical shaft portion 23 of drive shaft means 14 and shifted towards the rear until the threaded portion 30 is free, whereupon nut 31 is manually threaded onto the threaded portion 30 until nut 31 abuts the respective end face of gear 24.

During the first revolutions of output shaft 10 under a load, the gear 37 resists the torque transmitted from gear 24, so that the slanted gear teeth of gears 24 and 37 produce a force acting in axial direction on gear 24 to move the same towards the front into frictional engagement with nut 31.

The friction between gear 24 and nut 31, together with the slippage occurring between drive shaft means 14 and gear 24, holds the nut 31 against rotation while the threaded portion 23 is screwed into the nut, and causes axial movement of nut 31 towards the rear so that gear 24 is also moved towards the rear until abutting the inner ring of ball bearing 19 which is pressed against the front face 29 of the large diameter portion 15 of the drive shaft means 14.

In this manner, the nut 31 is automatically tightened during the operation of the power tool, and gear 24 is reliably held on cylindrical shaft portion 23 for rotation with the same, and is held the tighter, the greater the load acting on output shaft 10 is.

Therefore, it is not necessary to manually tighten the nut 31 after shaft 10 with gear 37 has been assembled.

The length of gear 24 is slightly greater than the distance between the abutment formed by inner ring of ball bearing 19, and the forward end of the cylindrical shaft portion 23, so that nut 31 can not, under any circumstances, engage cylindrical portion 23, but remains always on the threaded portion 30. The hub portion 25 of gear 24 has at opposite ends, annular planar abutment faces for nut 31 and the lateral annular face of the ring of ball bearing 19.

The circumferential and axial slant of the gear teeth of gear 24 is selected to correspond to a right-hand thread when shaft means 14 rotates in counterclockwise direction as viewed towards the front end, and vice verse. Furthermore, when drive shaft means 14 rotates in counterclockwise direction as viewed from the front end, the thread of nut means 31 is right-handed, and vice versa. However, drive shaft means 14 is always driven in the same direction of rotation by motor shaft 12.

It will be understood that each of the elements described above, or two or more together, may also find a useful application in other types of transmission gear mountings differing from the types described above.

While the invention has been illustrated and described as embodied in a self-tightening transmission gear mounting in which the load torque acting on an output gear, causes tightening of a nut holding a drive gear meshing with the output gear, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I CLAIM:

1. Self-tightening transmission gear mounting, comprising drive shaft means rotating in one direction of rotation and including a cylindrical shaft portion, an abutment at one end, and a threaded portion at the other end of said cylindrical shaft portion; a first gear mounted on said cylindrical portion and having a set of first gear teeth; nut means mounted on said threaded portion adjacent said first gear; and rotary output means including a second gear having a set of second gear teeth meshing with said first gear teeth, at least one of said sets having gear teeth slanted in axial and circumferential directions relative to said one direction of rotation so that said first gear moves in one axial direction along said cylindrical shaft portion into frictional engagement with said nut means when a load acts on said output means and said second gear opposes rotation of said first gear by said drive shaft means whereby said nut means is held by said output means and first gear against rotation and is tightened while said treaded portion of said drive shaft means screws into said nut means and said nut means moves in the opposite axial direction and presses said first gear against said abutment for non-rotatably securing said first gear to said drive shaft means.

2. Gear mounting as claimed in claim 1, wherein said first and second gears are bevel gears; and wherein said drive shaft means and output means are rotatable about two axes extending at right angles to each other.

3. Gear mounting as claimed in claim 1, wherein the axial length of said first gear is greater than the axial length of said cylindrical shaft portion so that said nut means is on said threaded portion when said first gear abuts said abutment while being engaged by said nut means.

4. Gear mounting as claimed in claim 3, wherein the diameter of said threaded portion is smaller than the diameter of said cylindrical shaft portion.

5. Gear mounting as claimed in claim 3, wherein said first gear includes a hub portion having said axial length of said first gear, and wherein said hub portion has annular abutment surfaces on opposite sides of said hub portion engaging said nut means and said abutment on said drive shaft, respectively.

6. Gear mounting as claimed in claim 5, wherein said annular abutment surfaces are planar and located in planes perpendicular to the axis of said cylindrical shaft portion.

7. Gear mounting as claimed in claim 1, wherein said drive shaft means includes a journal portion adjacent said one end of said cylindrical shaft portion; and comprising a ball bearing having an inner ring secured to said journal portion and forming said abutment at said one end of said cylindrical shaft portion.

8. Gear mounting as claimed in claim 1, wherein said first and second teeth of said first and second gear are both axially and circumferentially slanted.

9. Gear mounting as claimed in claim 8, wherein said first teeth are slanted and curved along circles in one circumferential direction; and wherein said second teeth are slanted and curved in the opposite circumferential direction as viewed from the center of the respective gear.

10. Gear mounting as claimed in claim 1, further comprising a motor having a motor shaft connected with said drive shaft means for rotation, and driving the same only in said one direction; wherein said output means include a rotary tool; and wherein said output means with said tool, and said motor shaft with said drive means are rotatable about two axes extending at right angles to each other.

* * * * *